United States Patent [19]

Schutt

[11] 4,162,169
[45] Jul. 24, 1979

[54] ALKALI-METAL SILICATE BINDERS AND METHODS OF MANUFACTURE

[75] Inventor: John B. Schutt, Silver Spring, Md.

[73] Assignee: The United States of America as represented by the Administrator of the National Aeronautics and Space Administration, Washington, D.C.

[21] Appl. No.: 862,880

[22] Filed: Dec. 21, 1977

[51] Int. Cl.$^2$ .......................... C09D 1/02; C09D 1/04
[52] U.S. Cl. ............................................ 106/74; 106/84
[58] Field of Search .................................. 106/74, 84

[56] References Cited
U.S. PATENT DOCUMENTS

| | | | |
|---|---|---|---|
| 2,786,042 | 3/1957 | Iler | 260/37 |
| 2,891,875 | 6/1959 | Phreaner | 106/308 |
| 3,009,829 | 11/1961 | Gouveia | 106/74 |
| 3,493,401 | 2/1970 | Schutt et al. | 106/84 |
| 3,522,066 | 7/1970 | Forsyth | 106/74 |
| 3,620,784 | 11/1971 | Schutt | 106/84 |

*Primary Examiner*—O. R. Vertiz
*Assistant Examiner*—Mark Bell
*Attorney, Agent, or Firm*—Ronald F. Sandler; John R. Manning; John O. Tresansky

[57] ABSTRACT

A paint binder utilizing a potassium or sodium silicate dispersion having a silicon dioxide to alkali-metal oxide mol ratio of from 4.8:1 to 6.0:1, the binder exhibiting stability during both manufacture and storage. The process of making the binder is predictable and repeatable and the binder may be made with inexpensive components. The high mol ratio is achieved with the inclusion of a silicon dioxide hydrogel. The binder, which also employs a silicone, is in the final form of a hydrogel sol.

21 Claims, No Drawings

ALKALI-METAL SILICATE BINDERS AND METHODS OF MANUFACTURE

ORIGIN OF THE INVENTION

The invention described herein was made by an employee of the United States Government and may be manufactured and used by or for the Government for governmental purposes without the payment of any royalties thereon or therefor.

BRIEF SUMMARY OF THE INVENTION

The invention relates to the process of making high mol ratio binders and the resulting binders. More particularly, the invention relates to alkali-metal silicate binders and related coatings and the methods of their manufacture.

The prior art includes alkali-metal oxide inorganic binders, some of which are composed of silicates such as silicon dioxide ($SiO_2$) and either potassium oxide ($K_2O$) or sodium oxide ($Na_2O$), or both, with water. Some prior art alkali-metal silicate binders additionally contain lithium oxide ($Li_2O$) for stability. With respect to the basic $SiO_2$-$K_2O$/$Na_2O$ silicate binders, a 5.3:1 silicon dioxide to alkali-metal oxide mol ratio was the highest achievable with the process used without resulting in a soft coating. Sometimes even a 4.8:1 mol ratio was difficult to achieve when silicone was added to the binder to allow for easy mixing of zinc dust or aluminum flakes which were added as protective elements for ferrous metals or aluminum alloys and also to improve adhesion. In such cases, sludging would sometimes result from the addition of the silicone.

Other prior art paint compositions utilized such ingredients as lithium hydroxide (LiOH) with the fundamental inorganic alkali-metal silicate binders so that silicon dioxide hydrogel may be added to raise the silicon dioxide to alkali-metal oxide mol ratio. The hydrogel solution is fundamentally unstable with, for example, sodium oxide, without the addition of the lithium hydroxide which, if added, becomes -Si—O—Li+ in solution. In the context of this invention, instability refers to the characteristic of the hydrated silicon—oxygen tetrahedral network or the tendency of some crystalline form of the silicon dioxide—alkali-metal to spinoidally separate out. The lithium has a benefit of providing a more water insoluble paint immediately after drying for about a period of one week. However, lithium compounds are expensive and the addition of the lithium to the binder makes any finally resulting point more difficult to apply in terms of adhesion.

Inorganic binders have been shown to exhibit superior corrosion protection capabilities over organic binders which are especially valuable with respect to protection of ferrous metals and aluminum alloys in a salt environment.

Accordingly, it is an object of the present invention to provide inorganic binders as well as the processes of making such binders.

Another object is to provide improved alkali-metal silicate binders as well as the process of making such binders.

A further object of the invention is to provide improved binders with high silicon dioxide to alkali-metal oxide mol ratios as well as the processes of making such binders.

Yet another object is to provide binders which are stable and do not sludge as well as the processes of making such binders.

Still another object is to provide inexpensive binders and the processes of making such binders.

Another still further object is to provide binders which are easy to apply and form hard coatings, and the processes of making such binders.

A further object is to provide binders to which protective elements or pigments may be easily added and the processes of making such binders.

A still further object is to provide superior binders for the protection of ferrous metals or aluminum alloys.

These and other objects of the present invention are achieved by a high silicon dioxide to alkali-metal oxide mol ratio inorganic alkali-metal silicate binder wherein the silicone induces the formation of a hydrogel sol. By a hydrogel sol is meant that the hydrogel originally added during the process of making the binder and which originally goes into solution, is eventually made to nucleate about the silicone molecules during later stages of the process thereby forming a bulk as well as surface hydrated colloid. The present invention also includes a process for making the binder which involves establishing a vortex in a starter alkali-metal silicate solution, adding a silicon dioxide hydrogel, adding water and adding silicone, all the while maintaining the vortex.

DETAILED DESCRIPTION OF THE PREFERRED EMBODIMENTS

The present invention employs well known and generally available components. Initially, a high silicon dioxide to alkali-metal oxide mol ratio is obtained in stable form by converting the binder to a hydrogel sol rather than a hydrogel solution. A high silicon dioxide to alkali-metal oxide mol ratio is desirable because the higher the mol ratio, the higher the water insolubility characteristic or the greater the water resistance of the applied coating. With respect to the instant invention, the high silicon dioxide to alkali-metal oxide mol ratio is obtained by the addition of a substantial amount of silicon dioxide hydrogel. The process employed prevents a part of the hydrogel from separating after initially going into solution. This is accomplished by creating conditions whereby a hydrogel sol is created.

The process is begun by weighing out a starter alkali-metal silicate solution that has a maximum of a 3.3 to 1 to alkali-metal oxide silicon dioxide mol ratio with a solids content of from 35–39%. (The solids content here is the weight of the combined weights the $SiO_2$ plus the $K_2O$ and/or $Na_2O$). This starter silicate solution may be obtained from the Philadelphia Quartz Company as Kasil 6 or GTE, Sylvania as PS7. These silicate solutions contain $K_2O$ and not $Na_2O$. Such starter silicate solutions are generally produced by taking $SiO_2$, KOH and/or NaOH and adding water and stirring, often by heating under pressure.

It has been found that using starter solutions with a higher mol ratio than hereinbefore described will require longer time periods to make the binder. In turn, if a lower mol ratio solution is used, more hydrogel would need to be added later in the process. In terms of solids content, a high solids content means that more water will have to be added later and a substantially lower solids content may mean that the process will not work.

The process is initiated by mixing the starter silicate solution. The preferred mode of mixing is to establish a vortex at the very beginning and to maintain the vortex throughout the remainder of the process. High speeds, in the order of 3000 to 4500 rpm, are usually maintained in order to quicken the process. Whatever speed is selected, the vortex should be maintained as close to the shaft as possible in order to keep the rate of the water additions minimal and the pH levels of the solution as high as possible so that the later added hydrogel will completely dissolve as quickly as possible. Silicon dioxide hydrogel (hydrated amorphous $SiO_2$) which has been previously ground to less than 350 microns and is preferably in the form of a powder or perhaps a slurry is then added to the starter solution. Such hydrogel may be obtained from the W. R. Grace Company as RD Hydrogel. The hydrogel is of neutral pH and is normally furnished at about a 65% water level, i.e., a 35% solids level. The water level must be kept to a minimum to avoid dropping the pH level of the solution. If the pH is dropped sufficiently, a solution may be unobtainable. If the particles are larger than nominally 350 microns there may be a tendency to form lumps and even to throw the particles out of the solution during the vortexing.

As the vortexing continues, the mixture thickens. Heat may be applied when the hydrogel is added to accelerate the solution of the hydrogel. Water, preferably demineralized, is trickled in periodically in amounts sufficient to maintain the vortex, or, in the case of a simple mixing procedure, water may be trickled in in amounts sufficient to alleviate the stiffness or to prevent gelation of the mixture. With the preferred vortexing procedure, water is added until the vortex stabilizes and a clear viscous solution is formed with a temperature between 35° and 70° C. Heat may be added if required.

The next step is to trickle in silicone. The silicone usually used is methyltrimethoxy silane. The minimum amount is about 1% by wight of the starter silicate solution. As much as 20% has been added but cost is a factor. The function of the silicone is to auto-stabilize the solution by converting the solution to a silicone nucleated hydrogen sol where the silicon dioxide from the hydrogel reacts with the hydrolyzed silicone. Methyltrimethoxy-silane $CH_3Si(OCH_3)_3$ is used because it is readily available, relatively inexpensive and contains three hydroxyl groups upon hydrolysis which promote water compatability. This silicone may be purchased from Dow Corning, Inc., designated as Z- 6070, or Union Carbide. Other such water compatible silicones may be used but most silicones are not compatible because they do not exhibit sufficient water miscibility or impart sufficient water insolubility to the final paint.

The resulting solution continues to be vortexed for about one-half hour until the silicone is hydrolyzed and translucent and a final quantity of water is then trickled into the solution until the final inorganic solids content is achieved as desired for a particular application. A paint may then be formed with the addition of protective elements for ferrous metals and aluminum alloys such as zinc dust or aluminum flakes which protect by galvanic action or by the addition of pigments for coloring or fillers to achieve a given film characteristic.

The binders resulting from the afore-described process will contain water, $SiO_2$ and $K_2O$ and/or $Na_2O$ and silicone in the form of methylsilanol $CH_3Si(OH)_3$ if the particular disclosed silicone is employed. The solution will be in the form of a hydrogel sol which may be discribed as a silicone-silicate co-polymer. It should be noted that no sludge is formed by the process and, therefore, no filtering is required. Since these binders are water based they dry by evaporation. Such binders may also be used as paints over cementacious materials or possibly wood. They also may be used with a nonporous overcoating.

If zinc or aluminum is added to the binder, the amount of the metal that is added is calculated from the binder constituents present after drying, i.e., it is based on the solids content only. The amount of aluminum added is about one pound per gallon. The amount of zinc added is in the range of 80-97% by weight of the total solids including the zinc itself. The traditional preferred amount is about 93% by weight of the solids. Since binder porosity is lower with less zinc, some applications would require less zinc.

Typical silicon dioxide to alkali-metal oxide mol ratios in the binders of this invention are from 4.8:1 to 6.0:1, the inorganic solids content being from about 19-27%. Such binders will have approximate constituent percentage ranges by weight as follows (assuming that the starter silicate solution contains only $K_2O$):

$K_2O$: 2.2-6.1%
$SiO_2$: 8.38-22.0%
$H_2O$: 61.0-86.7%
$CH_3Si(OH)_3$: 0.3-8.5%

A good binder, universally easily preparable, exhibiting a silicon dioxide to alkali-metal oxide mol ratio of 5.3:1 and with an inorganic solids content of from 20-22%, may have constituent percentage ranges by weight approximately as follows:

$K_2O$: 4.53-4.99%
$SiO_2$: 15.2-16.8%
$H_2O$: 77.0-79.1%
$CH_3Si(OH)_3$: 1.12-1.23%

It should be noted that even for a particular mol ratio, the constituents are presented in a range because the hydrogel water content may vary and the final sol, prior to the addition of, for example, protective elements, will have a variable water content depending on the amount of protective elements, i.e., zinc, added.

As hereinbefore noted, the higher the mol ratio of the binders the more water insoluble the final paint product will be after drying. However, as the mol ratio increases, the time for manufacture also lengthens because there is a fundamental requirement for more silica to dissolve. The higher mol ratio binder compositions will additionally require more careful control of the process, e.g. the water content of the hydrogel will be more critical and proper vortexing will be more difficult to maintain.

At a 5.6:1 silicon dioxide to alkali-metal oxide mol ratio the process may be accomplished at atmospheric pressure and typical ambient temperatures for small quantities prepared in a blender. This is probably because the high speed of the mixing creates some additional heat. For larger batch production in a vat, where somewhat lower speeds are available, heat may have to be applied externally, A binder with a silicon dioxide to alkali-metal oxide mol ratio of 5.6:1 and an inorganic solids content of from 19-26.6% by weight may have consituent percentage ranges approximately as follows:

$K_2O$: 4.1-6.1%
$SiO_2$: 14.8-22.0%
$H_2O$: 61.0-80.7%
$CH_3Si(OH)_3$: 0.4-10.9%

For a binder with a 6.0:1 silicon dioxide to alkali-metal oxide mol ratio and an inorganic solids content of 19-27% the percentage ranges approximately may be:

$K_2O$: 4.1-5.3%
$SiO_2$: 14.9-19.4%

$H_2O$: 66.8–80.7%
$CH_3Si(OH)_3$: 0.3–8.5%

The invention is further illustrated by the following examples in which all parts and percentages are by weight. The examples are illustrative of two embodiments of the invention and are provided to teach one skilled in the art how to practice the invention and to represent one mode contemplated for carrying out the invention.

EXAMPLE NO. 1

The following is a representative process for making approximately one gallon of an inorganic alkali-metal silicate binder with a silicon dioxide to alkali-metal oxide mol ratio of 5.3:1 and an inorganic solids content of about 26.5%.

This formulation will make somewhat less than a gallon of binder but will ordinarily make a gallon or more of paint when protective elements, pigment and/or filler are added.

(a) 2 Kg of a starter silicate solution comprised of 35% solids with a mol ratio of $SiO_2$ to $K_2O$ of 3.3:1 (equivalent to a weight ratio of 2.1:1) is weighed out.

(b) 0.823 kg of hydrogel comprised of 35% solids ($SiO_2$) is weighed out.

(c) 0.901 Kg of water is weighed out.

(d) 0.07 Kg of methyltrimethoxy-silane $CH_3Si(OCH_3)_3$ is weighed out and stored in a closed container.

(e) The starter silicate solution is poured into a container and rotated at 3000 r.p.m. to generate a vortex.

(f) The hydrogel is gradually poured into the resulting vortex. The speed may be increased somewhat but not to a speed which will expel the consituents from the container.

(g) The resulting mixture will gradually thicken and the vortex will tend to collapse toward the shaft of the impeller. The vortex is then expanded minimally back-out by trickling in water. The vortex-contraction, water trickle-expansion is repeated until the vortex stabilizes as close to the shaft thereof as practicable. The rate of vortex collapse and subsequent stabilizing water addition is greater at inception when the hydrogel is first added than towards the end of the process. When the vortex has stabilized, all but about 15 or 20% of the total water weighed out has been added and the solution is thick and warm. A clear viscous solution is formed with a temperature between approximately 35° and 70° C.

(h) While the vortexing continues, the silicone is trickled in from a dropper over an approximate 5 minute interval at the knee of the vortex. The addition of silicone will cause the vortex to expand due to an attendant drop in viscosity. The hydrogel sol is, at this point, beginning to form and the resulting solution becomes essentially transparent.

(i) Vortexing continues for up to one-half hour to insure that the silicone is thoroughly hydrolyzed. During this period the impeller speed can be slowed and the remaining water added.

(j) The final binder solution is immediately canned while still warm. During cooling—depending on how warm the solution was and how much silicone was added—a light scum may form on the surface (as opposed to a sludge on the bottom) which eventually dissolves upon standing within a day or less.

EXAMPLE NO. 2

The following is a representative process for making approximately one gallon of an inorganic alkali metal silicate binder with a silicon dioxide to alkali-metal oxide mol ratio of 5.6:1 and an inorganic solids content of about 27%. This formulation will make somewhat less than a gallon of binder but will ordinarily make a gallon or more of paint when protective elements, pigment or filler is added.

(a) 2 Kg of a starter silicate solution comprised of 35% solids with a mol ratio of $SiO_2$ to $K_2O$ of 3.3:1 (equivalent to a weight ratio of 2.1:1) is weighed out.

(b) 0.948 Kg of hydrogel comprised of 35% solids ($SiO_2$) is weighed out.

(c) 0.860 Kg of water is weighed out.

(d) 0.14 Kg of methyltrimethoxy-silane $CH_3Si(OCH_3)_3$ is weighed out and stored in a closed container.

(e) The starter silicate solution is poured into a container and rotated at 3000 r.p.m. to generate a vortex.

(f) The hydrogel is gradually poured into the resulting vortex. The speed may be increased somewhat but not to a speed which will expel the constituents from the container.

(g) The resulting mixture will gradually thicken and the vortex will tend to collapse toward the shaft of the impeller. The vortex is then expanded minimally back-out by trickling in water. The vortex-contraction, water trickle-expansion is repeated until the vortex stabilizes as close to the shaft thereof as practicable. The rate of vortex collapse and subsequent stabilizing water addition is greater at inception when the hydrogel is first added than towards the end of the process. When the vortex has stabilized, all but about 15 or 20% of the total water weighed out has been added and the solution is thick and warm. A clear viscous solution is formed with a temperature between approximately 35°–70°, preferably toward 70° C.

(h) While the vortexing continues, the silicone is trickled in from a dropper over an approximate 5 minute interval at the knee of vortex. The addition of silicone will cause the vortex to expand due to an attendant drop in viscosity. The hydrogel sol is, at this point, beginning to form and the resulting solution becomes essentially transparent.

(i) Vortexing continues for up to one-half hour to insure that the silicone is thoroughly hydrolyzed. During this period the impeller speed can be slowed and the remaining water added.

(j) The final binder solution is immediately canned while still warm. During cooling—depending on how warm the solution was and how much silicone was added—a light scum may form on the surface (as opposed to a sludge on the bottom) which eventually dissolves upon standing within a day or less.

The principles, preferred embodiments, and modes of operation of the present invention have been described in the foregoing specification. The invention which is intended to be protected, however, is not to be construed as limited to the particular forms disclosed since these are to be regarded as illustrative rather than restrictive. Variations and changes may be made by those skilled in the art without departing from the spirit of the present invention.

What is claimed is:

1. An inorganic alkali-metal silicate binder consisting essentially of an alkali-metal silicate, silicone and water in the form of a hydrogel sol.

2. An inorganic alkali-metal silicate binder according to claim 1 wherein the alkali-metal silicate includes $SiO_2$ and $K_2O$ and/or $Na_2O$.

3. An inorganic alkali-metal silicate binder according to claim 1 wherein the silicone is methylsilanol.

4. An inorganic alkali-metal silicate binder according to claim 1 wherein the binder has a silicon dioxide to alkali-metal oxide mol ratio of from about 4.8:1 to 6.0:1 and an inorganic solids content of about 19 to 27%.

5. An inorganic alkali-metal silicate binder according to claim 4 wherein the constituent ranges are about:
   $K_2O$: 2.2–6.1%
   $SiO_2$: 8.38–22.0%
   $H_2O$: 61.0–86.7%
   $CH_3Si(OH)_3$: 0.3–8.5%

6. An inorganic alkali-metal silicate binder according to claim 1 wherein the binder has a silicon dioxide to alkali-metal oxide mol ratio of about 5.3:1 and an inorganic solids content of from about 20 to 22%.

7. An inorganic alkali-metal silicate binder according to claim 6 wherein the constituent ranges are about:
   $K_2O$: 4.53–4.99%
   $SiO_2$: 15.2–16.8%
   $H_2O$: 77.0–79.1%
   $CH_3Si(OH)_3$: 1.12–1.23%

8. An inorganic alkali-metal silicate binder according to claim 1 wherein the binder has a silicon dioxide to alkali-metal oxide mol ratio of about 5.6:1 and an inorganic solids content of from about 19 to 27%.

9. An inorganic alkali-metal silicate binder according to claim 8 wherein the contituent ranges are about:
   $K_2O$: 4.1–6.1%
   $SiO_2$: 14.8–22.0%
   $H_2O$: 61.9–80.7%
   $CH_3Si(OH)_3$: 0.4–10.9%

10. An inorganic alkali-metal silicate binder according to claim 1 wherein the binder has a silicon dioxide to alkali-metal oxide mol ratio of about 6.0:1 and an inorganic solids content of from about 19 to 27%.

11. An inorganic alkali-metal silicate binder according to claim 10 wherein the constituent ranges are about:
    $K_2O$: 4.1–5.3%
    $SiO_2$: 14.9–19.4%
    $H_2O$: 66.8–80.7%
    $CH_3Si(OH)_3$: 0.3–8.5%

12. The process of making an inorganic alkali-metal silicate binder which comprises:
    (a) weighing out a starter alkali-metal silicate solution;
    (b) mixing the silicate solution with silicon dioxide hydrogel;
    (c) mixing the hydrogel-silicate solution mix with water;
    (d) mixing the water-hydrogel-silicate solution mix with silicone; and
    (e) mixing the silicone-water-hydrogel-silicate solution mix with an additional quantity of water.

13. The process of claim 12 wherein the mixing is by establishing a vortex throughout the process.

14. The process of claim 12 wherein the starter alkali-metal silicate solution has a maximum 3.3:1 silicon dioxide to alkali-metal mol ratio and a solids content of from 35 to 39%.

15. The process of claim 12 wherein the silicon dioxide in the hydrogel has a particle size of less than 350 microns.

16. The process of claim 12 wherein the silicone is methyltrimethoxy-silane.

17. The process of claim 12 wherein the silicone is a minimum of about 1% by weight of the starter silicate solution.

18. The process of claim 12 wherein the hydrogel-silicate solution is mixed with water until a clear viscous solution is formed with a temperature of between approximately 35° and 70° C.

19. The process of claim 12 wherein the water-hydrogel-silicate solution is mixed with silicone until the resulting solution becomes essentially translucent.

20. The process of making approximately one gallon of an inorganic alkali-metal silicate binder with a silicon dioxide to alkali-metal oxide mol ratio of 5.3:1 and an inorganic solids content of about 26.5% which comprises:
    (a) weighing out 2 Kg of a starter alkali-metal silicate solution with about a 35% solids content and a mol ratio of $SiO_2$ to $K_2O$ of 3.3:1;
    (b) weighing out 0.823 Kg of hydrogel comprised of 35% solids;
    (c) weighing out 0.901 Kg of water;
    (d) weighing out 0.07 kg of methyltrimethoxy-silane;
    (e) pouring the starter silicate solution into a container;
    (f) vortexing the solution at 3000 to 4500 r.p.m. and continuing the vortexing throughout the process;
    (g) pouring the hydrogel into the vortex;
    (h) trickling the water into the vortex and so expanding the vortex, the trickling continuing until the vortex has stabilized;
    (i) trickling the methyltrimethoxy-silane into the vortex; and
    (j) adding the remaining water and continuing the vortexing until the methyltrimethoxy-silane is completely hydrolyzed.

21. The process of making approximately one gallon of an inorganic alkali-metal silicate binder with a silicon dioxide to alkali-metal oxide mol ratio of 5.6:1 and an inorganic solids content of about 27% which comprises:
    (a) weighing out 2 Kg of a starter alkali-metal silicate solution with about a 35% solids content and a mol ratio of $SiO_2$ to $K_2O$ of 3.3:1;
    (b) weighing out 0.948 Kg of hydrogen comprised of 35% solids;
    (c) weighing out 0.860 Kg of water;
    (d) weighing out 0.14 Kg of methyltrimethoxy-silane;
    (e) pouring the starter silicate solution into a container;
    (f) vortexing the solution at 3000 to 4500 r.p.m. and continuing the vortexing throughout the process;
    (g) pouring the hydrogel into the vortex;
    (h) trickling the water into the vortex and so expanding the vortex, the trickling continuing until the vortex has stabilized;
    (i) trickling the methyltrimethoxy-silane into the vortex; and
    (j) adding the remaining water and continuing the vortexing until the methyltrimethoxy-silane is completely hydrolyzed.

* * * * *